(12) United States Patent
Martin

(10) Patent No.: US 7,864,431 B2
(45) Date of Patent: Jan. 4, 2011

(54) WINDSHIELD FOR USE WITH HEAD-UP DISPLAY AND/OR METHOD OF MAKING THE SAME

(75) Inventor: Danny Martin, Arlon (BE)

(73) Assignee: Centre Luxembourgeois de Recherches pour le Verre et la Ceramique S.A. (C.R.V.C.), Luxembourg (LU)

( * ) Notice: Subject to any disclaimer, the term of this patent is extended or adjusted under 35 U.S.C. 154(b) by 226 days.

(21) Appl. No.: 12/155,472

(22) Filed: Jun. 4, 2008

(65) Prior Publication Data

US 2009/0303604 A1    Dec. 10, 2009

(51) Int. Cl.
*G02B 27/14* (2006.01)

(52) U.S. Cl. .................................... 359/630

(58) Field of Classification Search .......... 359/630–633
See application file for complete search history.

(56) References Cited

U.S. PATENT DOCUMENTS

| | | | |
|---|---|---|---|
| 3,682,528 A | 8/1972 | Apfel et al. | |
| 4,413,877 A | 11/1983 | Suzuki et al. | |
| 5,128,659 A * | 7/1992 | Roberts et al. | 345/7 |
| 5,229,194 A | 7/1993 | Lingle et al. | |
| 5,563,734 A | 10/1996 | Wolfe et al. | |
| 5,688,585 A | 11/1997 | Lingle et al. | |
| 6,259,559 B1 * | 7/2001 | Kobayashi et al. | 359/485 |
| 6,447,891 B1 | 9/2002 | Veerasamy et al. | |
| 6,461,731 B1 | 10/2002 | Veerasamy et al. | |
| 6,514,620 B1 | 2/2003 | Lingle et al. | |
| 6,524,714 B1 | 2/2003 | Neuman et al. | |
| 6,576,349 B2 | 6/2003 | Lingle et al. | |
| 6,602,608 B2 | 8/2003 | Stachowiak | |
| 6,636,370 B2 * | 10/2003 | Freeman | 359/894 |
| 7,060,343 B2 | 6/2006 | Freeman | |
| 7,230,767 B2 | 6/2007 | Walck et al. | |
| 7,271,960 B2 | 9/2007 | Stewart et al. | |
| 7,355,796 B2 | 4/2008 | Robinson | |

* cited by examiner

*Primary Examiner*—Joseph Martinez
*Assistant Examiner*—James R Greece
(74) *Attorney, Agent, or Firm*—Nixon & Vanderhye P.C.

(57) ABSTRACT

Certain example embodiments relate to a head-up display system for a vehicle having a windshield. First and second substantially parallel spaced-apart substrates sandwich a polymer-inclusive interlayer. An anti-reflective coating is provided on a surface of one of the first and second substrates. The anti-reflective coating is arranged so as to optically remove or block at least some of light rays produced by an image source of the head-up display system so as to reduce the occurrence of multiple images being produced by the image source. The anti-reflective coating is provided on a surface of the first or second substrate opposite the polymer-inclusive interlayer. In certain example embodiments, the polymer-inclusive interlayer may include polyvinyl butyral and/or may have a substantially uniform thickness.

22 Claims, 6 Drawing Sheets

WINDSHIELD FOR USE WITH HEAD-UP DISPLAY AND/OR METHOD OF MAKING THE SAME

FIELD OF THE INVENTION

Certain example embodiments of this invention relate to windshields for use with head-up displays, and/or methods of making the same. More particularly, certain example embodiments relate to a windshield for use with a head-up display that includes an anti-reflective coatings that optically removes or blocks a second or ghost image created by the reflection of an image from an image source that would otherwise reduce the quality of the image to be viewed. In certain example embodiments, the anti-reflective coating may be applied to either surface 1 or surface 4 of the windshield, and the index of refraction of such an anti-reflective coating may be adjusted so as to accomplish the selective optical removal or blocking of the undesired image.

BACKGROUND AND SUMMARY OF EXAMPLE EMBODIMENTS OF THE INVENTION

To convey information to a viewer, head-up display (HUD) systems have been used to display or "fade" images representing information into the windshield of the vehicle, thus reducing the need for a driver or pilot to turn attention away from the road to be driven on or the air space to be flown in. Head-up display systems are often incorporated into aircraft cockpits for pilots to monitor flight information. More recently, HUD systems have been used in automotive vehicles such as cars, trucks, and the like. The HUD generally is positioned so as to reduce the viewer's need to glance downward to the vehicle dashboard and/or away from the viewing area in front of the vehicle. Thus, a head-up display (HUD) system for use with an automotive vehicle is a visual display arrangement that displays information to a viewer in the form of a virtual image, typically situated in space above the hood of the car, so that the viewer can view the road and objects outside the vehicle around and through the display along with the display itself.

In some current configurations, a projection display is situated behind the steering wheel and creates the image that projects light onto the windshield, which then reflects the light towards the driver. More particularly, a head-up display system generally includes a display projection system, a collimator, and a combiner. The projection system includes a light source that projects operating information through the collimator, which generally aligns the projected light rays. The collimated light is then reflected off the combiner, which is in the vehicle operator's field of view. In so doing, vehicle information such as, for example, fuel information, vehicle speed, and/or the like, may be displayed within the viewer's field of vision through the windshield and may permit the operator to more safely maintain eye contact with the road and other objects outside the vehicle, while also viewing the displayed information. The reflected images of the display may be focused at a position anywhere from immediately in front of the vehicle to optical infinity.

Unfortunately, current head-up display systems suffer from certain disadvantages. For example, to create a single image substantially free from ghosts, the windshield may reflect an image or light rays at a single surface with reduced (or no) reflection from all other surfaces. Laminated windshields have been used as the combiner in conventional head-up display systems to reflect primary display images. However, a secondary image is reflected off of the outer surface of the windshield (surface 1). This secondary image is superimposed over, but offset from, the primary image and thus reduces the overall image clarity, creating ghosting. In other words, conventional windshields suffer from a drawback in that they reflect off both the front and back surfaces with substantially equal efficiency.

One method of attempting to avoid multiple images involves creating a wedge in the windshield, which thereby superimposes the two images formed by the two reflections. This approach is disclosed in U.S. Pat. No. 6,636,370, the entire contents of which is hereby incorporated herein by reference. Although this approach may be effective with low-resolution images, it unfortunately does not maintain sufficient image registration over the entire viewing pupil for higher resolution images.

A similar approach involves angularly offsetting the outer major surfaces of the laminate within a first portion such that an image from the image projector source projected onto a first major surface of the laminate within the first portion is reflected in a manner that reduces double imaging of the reflected image. This approach is disclosed in U.S. Pat. No. 7,060,343, the entire contents of which is hereby incorporated herein by reference. To accomplish the offset, a special polymer-based interlayer is used. In particular, the polymer-based interlayer is a polyvinyl butyral known as wedge vinyl. The thickness of the wedge vinyl varies across a vertical cross-section of the windshield so that the surfaces of the glass substrates are no longer parallel or substantially parallel to one another. By using an appropriate angle, it is possible to re-align the two pictures coming from the first and fourth surfaces of the windshield, and the image becomes clearer.

Unfortunately, this approach is problematic for several reasons. For example, vehicles often have different windshields with different inclination angles and thus require different offset angles. As such, corresponding optical modeling and custom designs are needed for each particular design. Additionally, wedge PVB is much more expensive than standard PVB. Indeed, wedge PVB has been found to be, on average, about 6-7 times more expensive than standard PVB.

Thus, it will be appreciated that there is a need in the art for an improved head-up display and/or windshield for use with the same, that overcomes one or more of these and/or other disadvantages.

In certain example embodiments of this invention, a head-up display system for a vehicle is provided. A windshield includes first and second substantially parallel spaced-apart substrates sandwiching a polymer-inclusive interlayer, and an anti-reflective coating provided on a surface of one of the first and second substrates. An image source is configured to direct light rays corresponding to an image to be formed at the windshield. At least some of the light rays are optically removed or blocked via the anti-reflective coating. The first substrate is closest to the vehicle exterior and the second substrate is closest to the vehicle interior.

In certain example embodiments, a windshield for a vehicle for use with a head-up display system is provided. First and second substantially parallel spaced-apart substrates sandwich a polymer-inclusive interlayer. An anti-reflective coating is provided on a surface of one of the first and second substrates. The anti-reflective coating is arranged so as to optically remove or block at least some light rays produced by an image source of the head-up display system so as to reduce the occurrence of multiple images being produced by the image source. The anti-reflective coating is provided on a surface of the first or second substrate opposite the polymer-inclusive interlayer.

In certain example embodiments, a method of making a head-up display system for a vehicle having a windshield is provided. First and second substantially parallel spaced-apart glass substrates are provided. The first substrate is closest to the vehicle exterior and the second substrate is closest to the vehicle interior. A polymer-inclusive interlayer is provided between the first and second glass substrates. An anti-reflective coating is provided on a surface of the first or second glass substrate opposite the polymer-inclusive interlayer. The first and second glass substrates are laminated together using the polymer-inclusive interlayer in forming the vehicle windshield. An image source is configured to direct light rays at the windshield. The anti-reflective coating is arranged so as to optically remove or block at least some of the light rays from the image source.

In certain example embodiments, a method of forming an image in connection with a head-up display system for a vehicle having a windshield is provided. The windshield comprises first and second substantially parallel spaced-apart substrates sandwiching a polymer-inclusive interlayer, and an anti-reflective coating provided on a surface of one of the first and second substrates. An image source is configured to direct light rays at the windshield. Light rays are directed at the windshield from the image source to form the image. The anti-reflective coating is arranged so as to optically remove or block at least some light rays produced by the image source so as to reduce the occurrence of multiple images being produced by the image source. The anti-reflective coating is provided on a surface of the first or second substrate opposite the polymer-inclusive interlayer.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
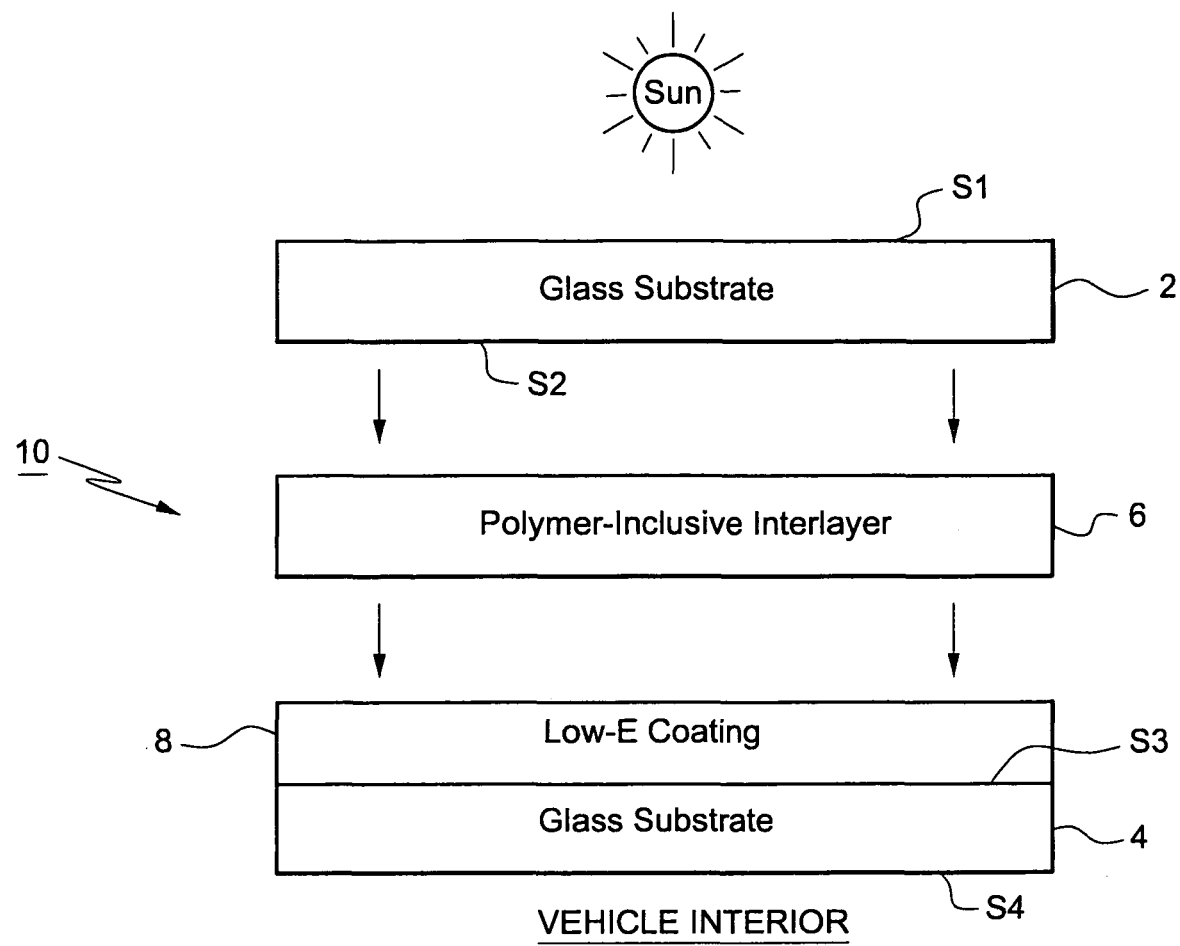
FIG. 1 is an exploded cross-sectional view of a conventional vehicle windshield.

In certain example embodiments of this invention, a head-up display system for a vehicle is provided. A windshield includes first and second substantially parallel spaced-apart substrates sandwiching a polymer-inclusive interlayer, and an anti-reflective coating provided on a surface of one of the first and second substrates. An image source is configured to direct light rays corresponding to an image to be formed at the windshield. At least some of the light rays are optically removed or blocked via the anti-reflective coating. The first substrate is closest to the vehicle exterior and the second substrate is closest to the vehicle interior.

In certain example embodiments, a windshield for a vehicle for use with a head-up display system is provided. First and second substantially parallel spaced-apart substrates sandwich a polymer-inclusive interlayer. An anti-reflective coating is provided on a surface of one of the first and second substrates. The anti-reflective coating is arranged so as to optically remove or block at least some light rays produced by an image source of the head-up display system so as to reduce the occurrence of multiple images being produced by the image source. The anti-reflective coating is provided on a surface of the first or second substrate opposite the polymer-inclusive interlayer.

In certain example embodiments, a method of making a head-up display system for a vehicle having a windshield is provided. First and second substantially parallel spaced-apart glass substrates are provided. The first substrate is closest to the vehicle exterior and the second substrate is closest to the vehicle interior. A polymer-inclusive interlayer is provided between the first and second glass substrates. An anti-reflective coating is provided on a surface of the first or second glass substrate opposite the polymer-inclusive interlayer. The first and second glass substrates are laminated together using the polymer-inclusive interlayer in forming the vehicle windshield. An image source is configured to direct light rays at the windshield. The anti-reflective coating is arranged so as to optically remove or block at least some of the light rays from the image source.

In certain example embodiments, a method of forming an image in connection with a head-up display system for a vehicle having a windshield is provided. The windshield comprises first and second substantially parallel spaced-apart substrates sandwiching a polymer-inclusive interlayer, and an anti-reflective coating provided on a surface of one of the first and second substrates. An image source is configured to direct light rays at the windshield. Light rays are directed at the windshield from the image source to form the image. The anti-reflective coating is arranged so as to optically remove or block at least some light rays produced by the image source so as to reduce the occurrence of multiple images being produced by the image source. The anti-reflective coating is provided on a surface of the first or second substrate opposite the polymer-inclusive interlayer.

Referring now more particularly to the drawings in which like reference numerals indicate like components throughout the several views, FIG. 1 is an exploded cross-sectional view of a conventional vehicle windshield 10. A first glass substrate 2 and a second glass substrate 4 are provided in a substantially parallel, spaced-apart relation to one another. Initially, these glass substrates 2 and 4 are flat. The glass substrates 2 and 4 may be heat treated (e.g., thermally tempered, heat bent, and/or heat strengthened). This heat treatment typically is at temperatures of at least 500° C., and more preferably at least about 600° C. During this heat treatment, in certain example windshield applications, the glass substrates 2 and 4 may be bent to the desired curved shape for the desired windshield application.

A polymer-inclusive laminating interlayer 6 of or including polyvinyl butyral (PVB) or any other suitable polymer-based laminating material (such as, for example, ethyl vinyl acetate or EVA) is provided so as to laminate glass substrates 2 and 4 to one another as shown in FIG. 1. In the laminating process, which typically involves autoclaving, the two glass substrates 2 and 4 with interlayer 6 therebetween are heated to typical laminating temperature(s) to laminate the glass substrates to one another and also form the vehicle windshield 10 or other laminated window product. The first and second parallel, spaced apart substrates 2 and 4 thus sandwich the polymer-inclusive interlayer 6, which is substantially uniform in thickness, in the assembled windshield 10.

A heatable coating and/or a low-emissivity (low-E) coating optionally may be deposited between the glass substrates 2 and 4 via sputtering or the like. For example, as shown in FIG. 1, a low-E coating 8 is applied to surface 3 of the windshield 10. The heatable coating may be substantially transparent to visible light and may include a transparent conductive layer of a material such as indium-tin-oxide (ITO) or silver (Ag) or may be a multi-layer coating including one or more conductive layers of ITO, Ag, or the like, that may be separated from one another by dielectric layer(s).

For example, and without limitation, any of the coatings in any of the following U.S. Patents may be used as the low-E coating 8: U.S. Pat. Nos. 6,461,731; 6,447,891; 6,602,608; 6,576,349; 6,514,620; 6,524,714; 5,688,585; 5,563,734; 5,229,194; 4,413,877 and 3,682,528, all of which are hereby incorporated herein by reference.

Figure 2:
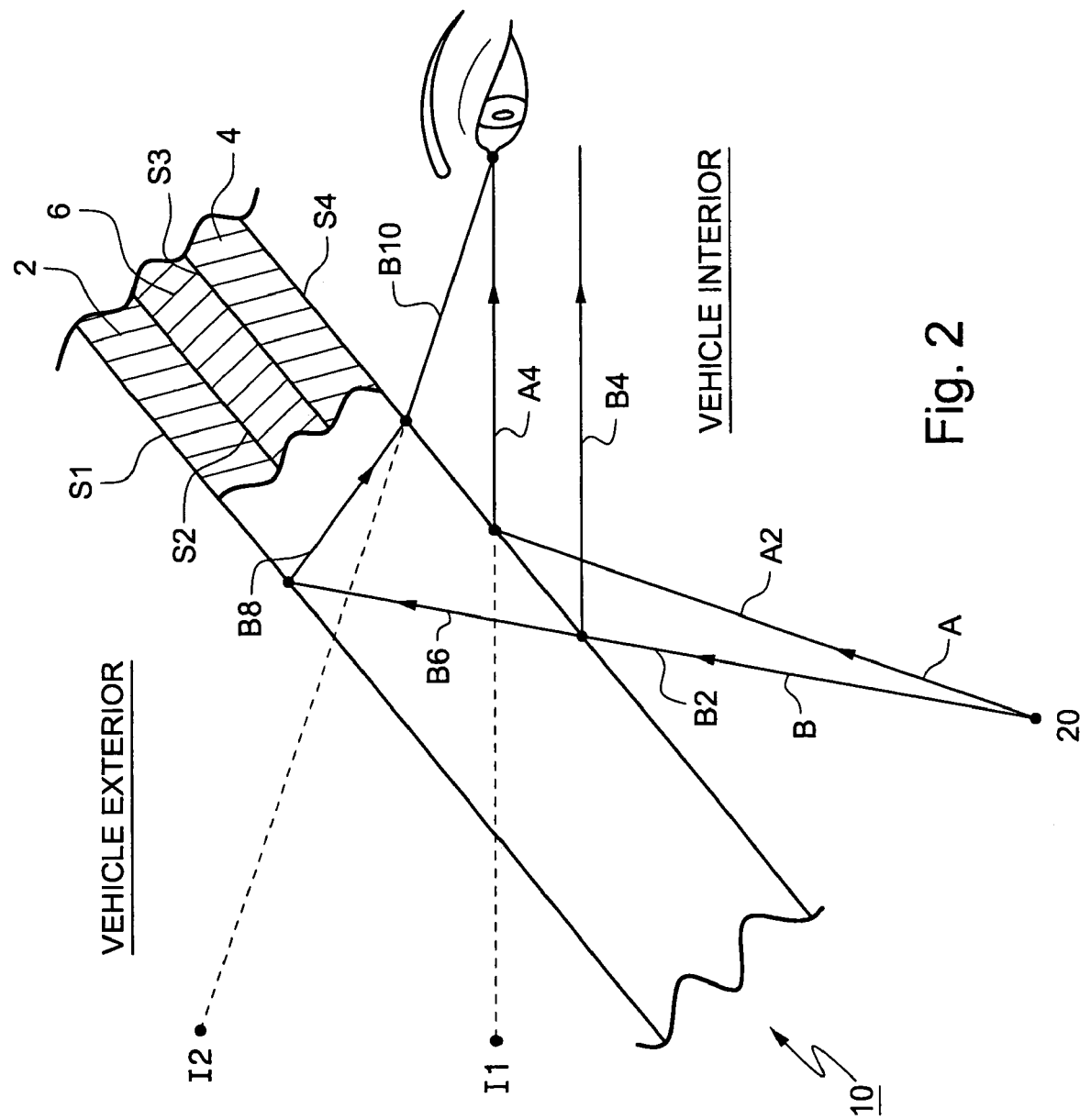
FIG. 2 is an enlarged, partial cross-sectional view of illustrating operational principles of a conventional head-up display using a windshield incorporating an interlayer having a uniform thickness.

FIG. 2 is an enlarged, partial cross-sectional view of illustrating operational principles of a conventional head-up display using a windshield 10 incorporating an interlayer 6 having a uniform thickness. The optional low-E coating 8 shown in FIG. 1 is omitted from FIG. 2 for simplicity and clarity in the following explanation.

A light ray A from image source 20 is directed along line A2, and a portion of the light ray A is reflected off of surface 4 of the second substrate 4 along line A4 to the eye of the vehicle operator. Additional light rays from the source 20 are directed along additional lines. For example, light ray B is directed along line B2, and a portion of the light ray B is reflected off of surface 4 along line B4 toward the eye of the vehicle operator. However, the ray B along the line B4 is not directed to the eye, as shown in FIG. 2, so it will not be detected by the observer.

A portion of the light ray B that is directed along line B2 will enter the windshield assembly 10 and be refracted along line B6. The angular difference between the lines B2 and B6 depends at least in part on the angle of refraction as the light ray passes through the air and into the second glass substrate 4. The angle of refraction, in turn depends in part on the angle at which ray B is incident on surface 4, and the relative densities of the air and the glass. The ray B passes through the windshield assembly 10 and a portion of the light ray B is reflected off of surface 1 of the first glass substrate 2 along line B8. It is assumed that the refractive index of the polymer-inclusive interlayer 6 is essentially the same as that of the first and second glass substrates 2 and 4 so that the light rays are not redirected as they pass through the windshield assembly 10 along lines B6 and B8. However, this may not be the case in all windshield assemblies.

A portion of the light ray B leaves the windshield assembly 10 at surface 4 of the second glass substrate 4, where the direction of the light is again changed because of the difference in the refraction index between the windshield assembly 10 and the air, as discussed earlier, and it is directed along line B10 to the operator's eye. Because the light rays A and B received by the eye from the image source 20 are along two different lines (lines A4 and B10 in this illustrative example), which are convergent toward one another to the eye of the observer (e.g., rather than parallel), the observer will perceive two offset images, even though there is only one image source 20. The first image I1, or virtual image, is the image seen by the observer from the portion of the light ray A directed along line A4. The second image I2 is the image seen by the observer from the portion of the light ray B directed along line B10.

When viewing both images I1 and I2, the virtual image I1 will appear brighter than the second image I2 because a greater portion of the light from the image source 20 that initially was directed along line A2 will be directed along line A4, as compared to the amount of light initially directed along line B2 that ultimately is directed along line B10 to the observer. The condition of seeing two offset images is commonly referred to as double imaging, or ghost imaging, and tends to result when the outer surfaces of the windshield assembly 10 (surfaces 1 and 4), are parallel to each other. Differently stated, double imaging occurs when the light rays A and B, projected from image source 20 onto parallel surfaces 1 and 4 of the windshield assembly 10, are directed toward the eye of the observer along non-parallel lines (lines A4 and B10 in this illustrative example), which converge toward each other to the eye of the operator.

In certain example embodiments, however, an anti-reflective coating is applied to either surface 4 or surface 1 of the windshield. This coating helps to substantially completely optically remove or block one of the images created by the reflection of the image by either surface 1 or surface 4 of the windshield. As demonstrated above, the second image would otherwise reduce the quality of the image to be viewed. However, because one of the two images is substantially completely optically eliminated or blocked in certain example embodiments, there is no need to align the two images. In certain example embodiments, the index of refraction of the anti-reflective coating may be adjusted so as to accomplish the selective optical removal or blocking of an undesired image to reduce (and sometimes even eliminate) ghosting and/or other undesirable image artifacts or effects associated with conventional head-up displays.

Figure 3A:
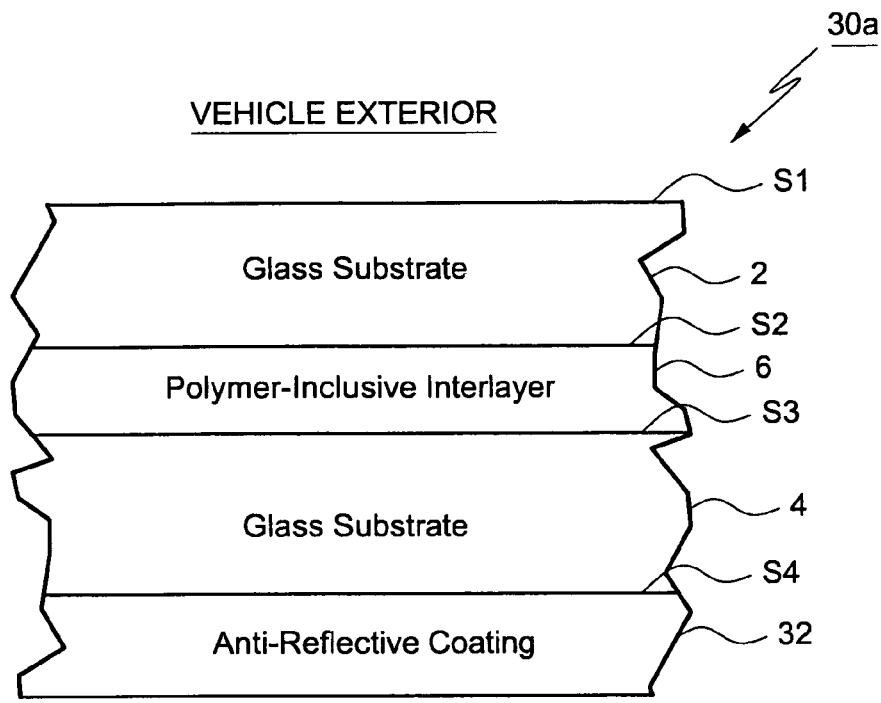
FIG. 3a is a cross-sectional view of a vehicle windshield in accordance with an example embodiment.

To this end, FIG. 3a is a cross-sectional view of a vehicle windshield 30a in accordance with an example embodiment. The windshield 30a of FIG. 3a is similar to the windshield 10 of FIG. 1. Thus, first and second substantially parallel spaced-apart glass substrates 2 and 4 sandwich a substantially uniform polymer-inclusive interlayer 6. Unlike the windshield 10 shown in FIG. 1, however, the windshield 30a shown in FIG. 3a includes an anti-reflective coating 32 on surface 4 thereof. That is, an anti-reflective coating 32 is formed on the surface of the second glass substrate 4 nearest the interior of the vehicle. As shown in greater detail below (with reference to FIG. 4a, for example), one of the two images produced by the reflection off of the first and fourth surfaces of the windshield 30a is substantially completely optically eliminated or blocked by the anti-reflective coating 32.

Figure 3B:
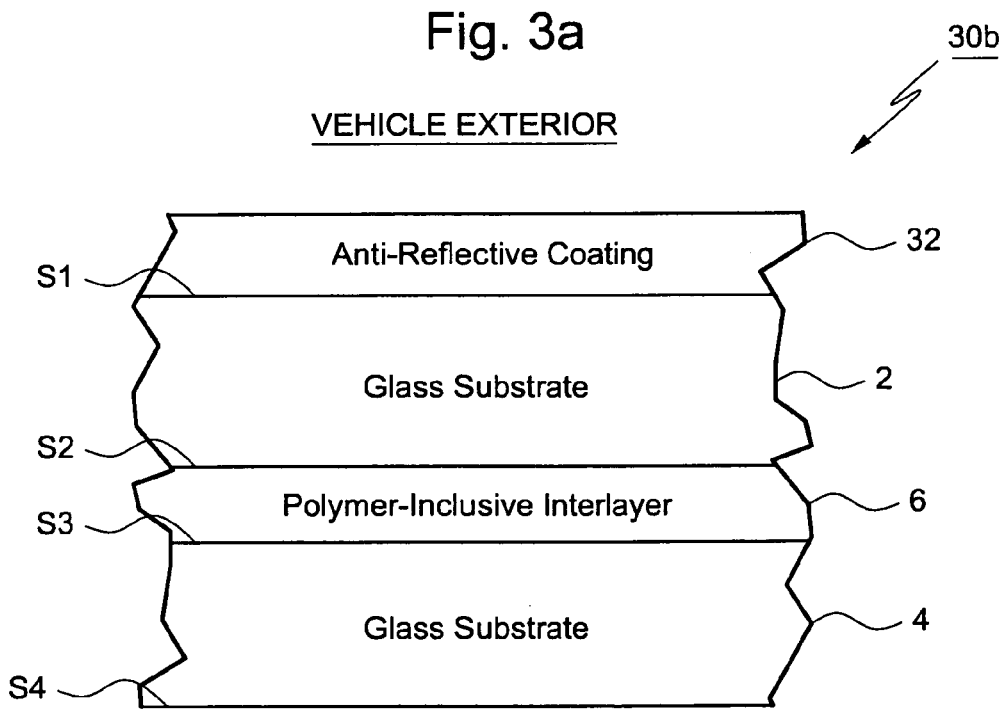
FIG. 3b is a cross-sectional view of another vehicle windshield in accordance with an example embodiment.

FIG. 3b is an exploded cross-sectional view of another vehicle windshield 30b in accordance with an example embodiment. FIG. 3b is similar to FIG. 3a, except that the anti-reflective coating 32 is provided to surface 1 thereof. That is, an anti-reflective coating 32 is formed on the surface of the first glass substrate 2 nearest the exterior of the vehicle. As shown in greater detail below (with reference to FIG. 4b, for example), one of the two images produced by the reflection off of the first and fourth surfaces of the windshield 30a is substantially completely optically eliminated or blocked by the anti-reflective coating 32.

Figure 4A:
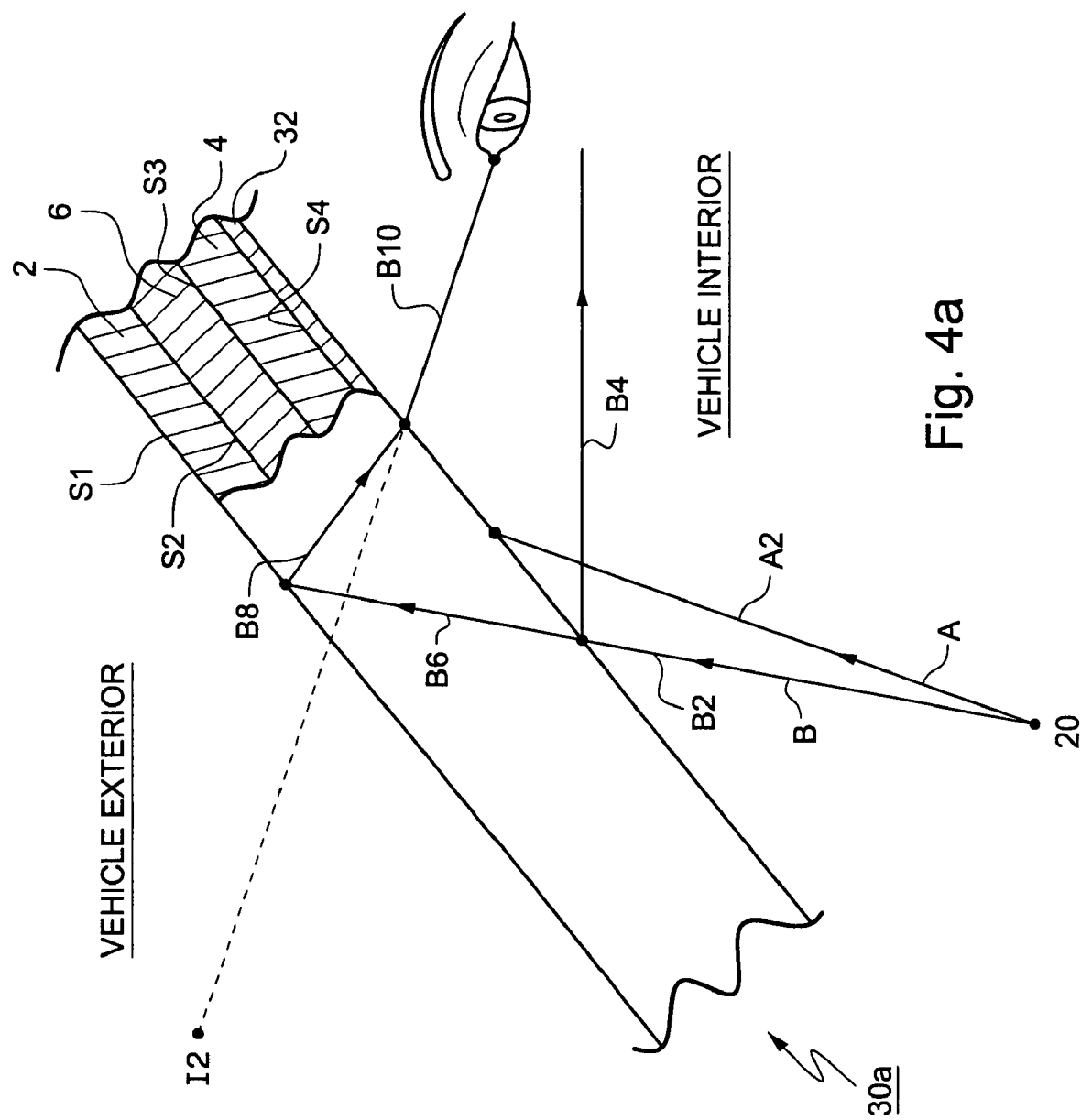
FIG. 4a is an enlarged, partial cross-sectional view of a head-up display using the windshield of FIG. 3a in accordance with an example embodiment.

FIG. 4a is an enlarged, partial cross-sectional view of a head-up display using the windshield 30a of FIG. 3a in accordance with an example embodiment. FIG. 4a is similar to FIG. 2. However, as noted above, the windshield 30a includes an anti-reflective coating 32 on surface 4 thereof, whereas the windshield 10 does not include such a coating. As above, an image source 20 produces a plurality of light rays including, for example, light rays A and B. Light ray A travels along line A2 until it reaches the coating 32 applied to surface 4 of the windshield 30a, The coating 32 applied to surface 4 of the windshield 30a, however, is arranged (for example, has a particular index of refraction) such that some or all of the light ray A is absorbed therein or blocked thereby. Thus, unlike the arrangement shown in FIG. 2, some or all light from light ray A does not reflect off of surface 4 and thus does not reach the eye of the operator. Accordingly, image I1 is not formed or is only partially formed.

By contrast, light from light ray B is transmitted as described above. Accordingly, image I2 is formed, whereas image I1 is not. Thus, one of the two images is substantially completely optically eliminated or blocked. Because there is only one image, the ghosting, artifact, and/or other image degradation problems associated with conventional head-up display techniques is/are reduced.

Figure 4B:
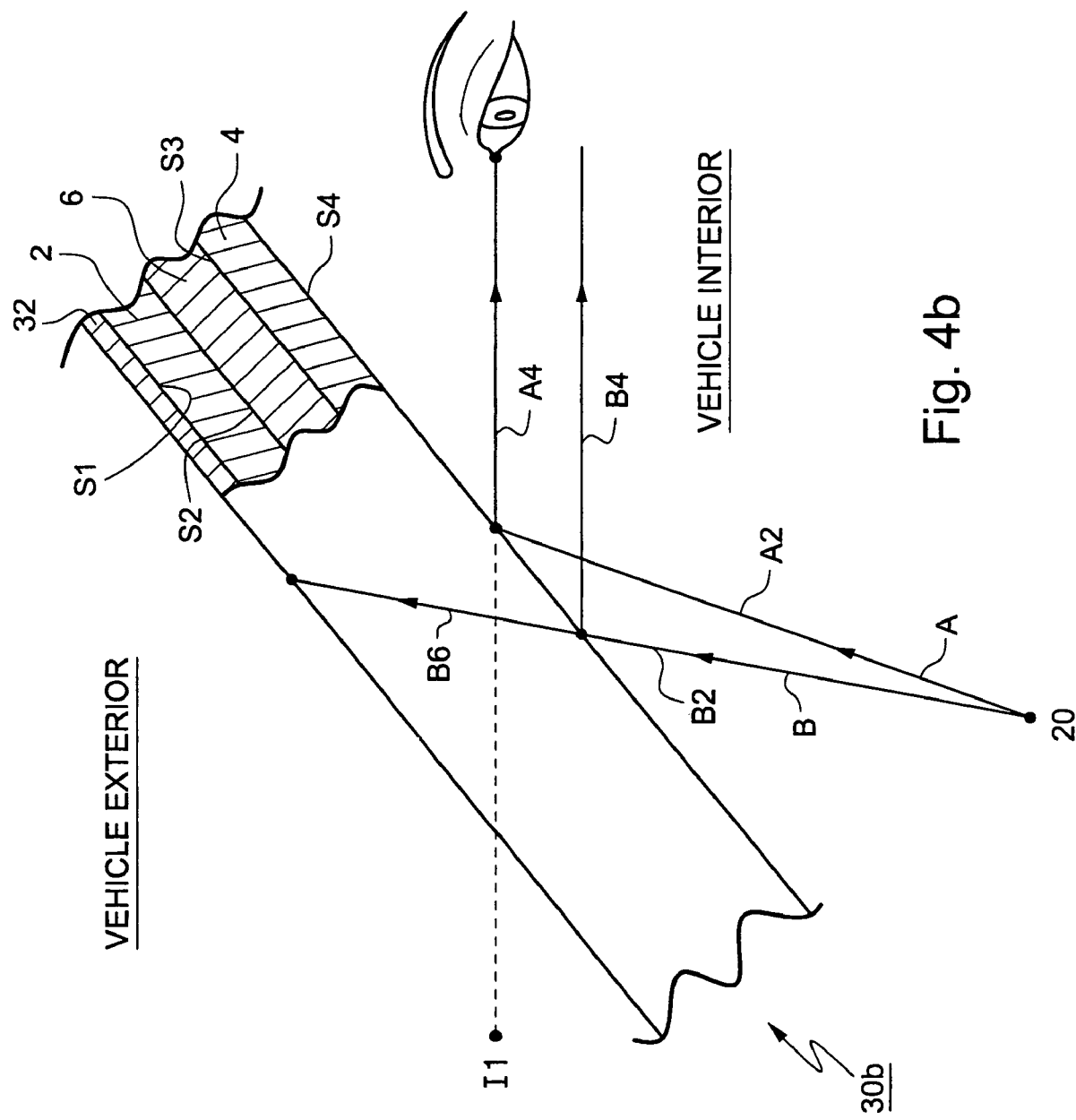
FIG. 4b is an enlarged, partial cross-sectional view of a head-up display using the windshield of FIG. 3b in accordance with an example embodiment.

FIG. 4b is an enlarged, partial cross-sectional view of a head-up display using the windshield 30b of FIG. 3b in accordance with an example embodiment. FIG. 4b is similar to FIG. 4a and thus also is similar to FIG. 2. However, as noted above, the windshield 30b includes an anti-reflective coating 32 on surface 1 thereof, whereas the windshield 10 does not include such a coating and whereas the windshield 30a includes such a coating on surface 4 thereof. As above, an image source 20 produces a plurality of light rays including, for example, light rays A and B. Light ray A travels along line A2 until it reaches surface 4 of the windshield 30a, It is then reflected along line A4 to the eye of the viewer. Consequently, a first image I1 is formed. Light ray B travels along line B2. Some of the light may be reflected back along line B4. Other light from light ray B passes through the second substrate 4, the polymer-inclusive interlayer 6, and the first substrate 2, until it reaches the coating 32 applied to surface 1 of the windshield 30b, As above, refraction may occur as the light ray B passes through one or more of the second substrate 4, the polymer-inclusive interlayer 6, and the first substrate 2. The coating 32 applied to surface 1 of the windshield 30b, however, is arranged (for example, has a particular index of refraction) such that some or all of the light ray B is absorbed therein or blocked thereby. Thus, unlike the arrangement shown in FIG. 2, some or all light from light ray B does not reflect off of surface 1 and thus does not reach the eye of the operator. Accordingly, image I2 is not formed.

By contrast, as already noted, light from light ray A is transmitted as described above. Accordingly, image I1 is formed, whereas image I2 is not. Thus, one of the two images is substantially completely optically eliminated or blocked. Because there is only one image, the ghosting, artifact, and/or other image degradation problems associated with conventional head-up display techniques is/are reduced.

It will be appreciated that in FIGS. 4a, the coating 32 may also substantially completely eliminate or block the reflection of light rays A and B at other undesirable portions (e.g., along line B4). Similarly, it will be appreciated that in FIG. 4b, the coating 32 may also substantially completely eliminate or block the reflection of light rays A and B at other undesirable portions (e.g., by eliminating or blocking the reflection of light ray A from surface 1 of the windshield 30b).

A low-E coating apart from the anti-reflective coating 32 may be provided to the windshields in certain example embodiments. However, it will be appreciated that the low-E coating may be selected (e.g., have an index of refraction) such that it does not interfere with the operation of the image source 20 and/or the anti-reflective coating 32. For example, a low-E coating that fully or partially blocks light rays that ultimately will be removed or blocked by the anti-reflective coating 32 may be acceptable in certain example embodiments, whereas a low-E coating that fully or partially blocks light rays that ultimately should not be allowed to form an image (e.g., and not removed or blocked by the anti-reflective coating 32) are not as desirable.

Figure 5:
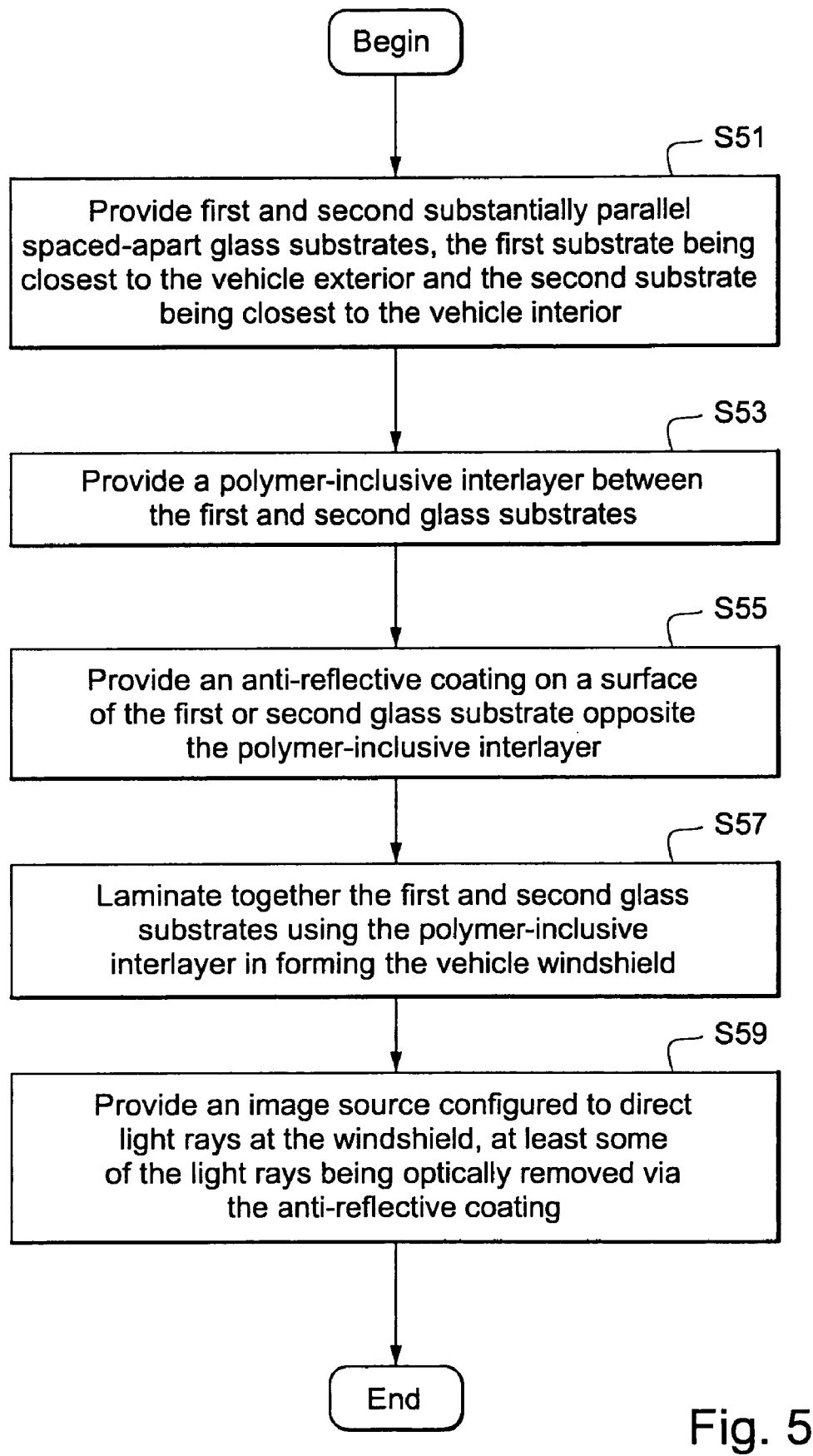
FIG. 5 is a flowchart showing an illustrative process for enabling a head-up display for use with a windshield in a vehicle in accordance with an example embodiment.

FIG. 5 is a flowchart showing an illustrative process for enabling a head-up display for use with a windshield in a vehicle in accordance with an example embodiment. First and second substantially parallel spaced-apart glass substrates are provided in step S51. The first substrate is closest to the vehicle exterior, and the second substrate is closest to the vehicle interior. A polymer-inclusive interlayer is provided between the first and second glass substrates in step S53. In step S55, an anti-reflective coating is provided on a surface of the first or second glass substrate opposite the polymer-inclusive interlayer. The anti-reflective coating may be applied to the surface in any suitable manner including, for example, via sputtering, CVD, spray coating, etc. In step S57, the first and second glass substrates are laminated together using the polymer-inclusive interlayer in forming the vehicle windshield. In certain example embodiments, after lamination, the polymer-inclusive interlayer has a substantially uniform thickness, e.g., when viewed in cross-section. An image source configured to direct light rays corresponding to an image to be formed at the windshield is provided in step S59. At least some of the light rays are optically removed or blocked via the anti-reflective coating.

In certain example embodiments, the image source may project light rays so as to form various images. Such images may be related to the operation of the vehicle. For example, such images may be indicative of vehicle speed, fuel or oil levels, engine temperature, a currently tuned radio station, light activation status, etc. However, other images unrelated to the operation of the vehicle may be provided. For example, weather conditions (e.g., temperature, humidity, etc.), videos, email message, etc., may be displayed in accordance with certain example embodiments.

In one or more optional steps, one or both of the glass substrates may be heat treated or tempered, e.g., to strengthen glass. Also optionally, an assembled windshield may be bent, e.g., to a desired curvature. In certain example embodiments, an additional low-E coating may be applied to a surface of the windshield (e.g., to surface 2 or surface 3), provided that the low-E coating does not substantially interfere with the operation of the image source and the anti-reflective coating.

In general, the inclusion of an anti-reflective coating on the inner side of the front windshield (e.g., surface 2 or 3) coveys a number of advantages. For example, it reduces the internal reflection (e.g., of the dashboard), which has become more and more of an issue because of the recent trend to continue to decrease the installation angles of the front windshield. It is also possible to increase the transmission of visible light. Additional solar control possibilities also are presented. With a higher light transmission, it is possible to built more efficient solar control products, e.g., by increasing transmission or reflection while still maintaining the at least about 70% visible light transmission typically found in the U.S. (and the at least about 75% visible light transmission typically found in Europe). These advantages are maintained by the arrangements of certain example embodiments, which also enable standard PVB to be used in windshields, even when head-up displays are implemented. It will be appreciated that the anti-reflective coatings of certain example embodiments may provide and/or serve as a complement to these and/or other example advantages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A head-up display system for a vehicle, comprising:
a windshield including first and second substantially parallel spaced-apart substrates sandwiching a polymer-inclusive interlayer, wherein the first substrate is closest to the vehicle exterior and the second substrate is closest to the vehicle interior;
an anti-reflective coating provided on a surface of the first substrate;
an image source configured to direct light rays corresponding to an image to be formed at the windshield, wherein the anti-reflective coating on the surface of the first substrate prevents at least some of the rays from being reflected off of the surface of the first substrate and toward the viewer; and
wherein the image seen by the viewer is formed substantially by means of reflection off of a surface of the second substrate.

2. The head-up display system of claim 1, wherein the anti-reflective coating is provided on a surface of the first substrate opposite the polymer-inclusive interlayer.

3. The head-up display system of claim 1, wherein the windshield further comprises a low-E coating, the low-E coating being separate from the anti-reflective coating.

4. The head-up display system of claim 1, wherein the polymer-inclusive interlayer comprises polyvinyl butyral.

5. The head-up display system of claim 1, wherein the polymer-inclusive interlayer has a substantially uniform thickness.

6. The head-up display system of claim 1, wherein the windshield has a visible transmission of at least about 70%.

7. The head-up display system of claim 1, wherein the windshield has a visible transmission of at least about 75%.

8. A windshield for a vehicle for use with a head-up display system, comprising:
first and second substantially parallel spaced-apart substrates sandwiching a polymer-inclusive interlayer, wherein the first substrate is closest to the vehicle exterior and the second substrate is closest to the vehicle interior; an anti-reflective coating provided on a surface of the second substrate; and
wherein the anti-reflective coating is arranged so as to prevent at least some light rays produced by an image source of the head-up display system from being reflected off of the surface of the second substrate and toward a viewer so as to reduce the occurrence of multiple images being produced by the image source, wherein the reflected image seen by the viewer is formed substantially by means of reflection off of a surface of the first substrate.

9. The windshield of claim 8, further comprising a low-E coating, the low-E coating being separate from the anti-reflective coating.

10. The windshield of claim 8, wherein the polymer-inclusive interlayer comprises polyvinyl butyral.

11. The windshield of claim 8, wherein the polymer-inclusive interlayer has a substantially uniform thickness.

12. The windshield of claim 8, wherein the windshield has a visible transmission of at least about 70%.

13. The windshield of claim 8, wherein the windshield has a visible transmission of at least about 75%.

14. A method of making a head-up display system for a vehicle having a windshield, the method comprising:
providing first and second substantially parallel spaced-apart glass substrates, the first substrate being closest to the vehicle exterior and the second substrate being closest to the vehicle interior;
providing a polymer-inclusive interlayer between the first and second glass substrates;
providing an anti-reflective coating on a surface of the first glass substrate opposite the polymer-inclusive interlayer;
laminating together the first and second glass substrates using the polymer-inclusive interlayer in forming the vehicle windshield;
providing an image source configured to direct light rays at the windshield,
wherein the anti-reflective coating is arranged so as to prevent at least some of the light rays from the image source from being reflected off of the first glass substrate and toward the viewer; and
forming an image by means of reflecting at least some light rays off of a surface of the second glass substrate.

15. The method of claim 14, further comprising providing a low-E coating to a surface of the first or second glass substrate, the low-E coating being separate from the anti-reflective coating.

16. The method of claim 14, wherein the polymer-inclusive interlayer comprises polyvinyl butyral.

17. The method of claim 14, wherein the polymer-inclusive interlayer has a substantially uniform thickness.

18. The method of claim 14, wherein the windshield has a visible transmission of at least about 70%.

19. The method of claim 14, wherein the windshield has a visible transmission of at least about 75%.

20. The method of claim 14, wherein the anti-reflective coating is deposited by sputtering, chemical vapor deposition, and/or spray coating.

21. A method of forming an image in connection with a head-up display system for a vehicle having a windshield, the method comprising:
providing the windshield, the windshield comprising first and second substantially parallel spaced-apart substrates sandwiching a polymer-inclusive interlayer, and providing an anti-reflective coating on a surface of the second substrate;
providing an image source configured to direct light rays at the windshield; and
directing light rays at the windshield from the image source to form the image,
arranging the anti-reflective coating so as to prevent at least some light rays produced by the image source from being reflected off of the surface of the second substrate so as to reduce the occurrence of multiple images being produced by the image source, wherein the image is formed by means of reflection off of a surface of the first substrate, and
wherein the anti-reflective coating is provided on a surface of the second substrate opposite the polymer-inclusive interlayer.

22. The method of claim 21, wherein the anti-reflective coating is deposited by sputtering, chemical vapor deposition, and/or spray coating.

* * * * *